(12) United States Patent
Martin et al.

(10) Patent No.: US 9,852,754 B1
(45) Date of Patent: Dec. 26, 2017

(54) SERPENTINE SEEKS DURING DATA STORAGE DEVICE IDLE PERIODS

(71) Applicant: Seagate Technology LLC, Cupertino, CA (US)

(72) Inventors: Richard E. Martin, Longmont, CO (US); Abhay T. Kataria, Longmont, CO (US); Dipeshkumar J. Purani, Shakopee, MN (US); Richard A. Herr, Chanhassen, MN (US); Alexander T. Le, Thornton, CO (US); Sandeep D. Sequeira, Johnstown, CO (US); LingZhi Yang, Longmont, CO (US); Ximin Shan, Longmont, CO (US); Salman Al Saif, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/281,770

(22) Filed: Sep. 30, 2016

Related U.S. Application Data

(60) Provisional application No. 62/372,594, filed on Aug. 9, 2016.

(51) Int. Cl.
*G11B 5/09* (2006.01)
*G11B 5/55* (2006.01)

(52) U.S. Cl.
CPC .................... *G11B 5/5547* (2013.01)

(58) Field of Classification Search
None
See application file for complete search history.

(56) References Cited

U.S. PATENT DOCUMENTS

| | | | |
|---|---|---|---|
| 4,413,317 A * | 11/1983 | Swenson | G06F 3/0601 710/38 |
| 6,018,432 A | 1/2000 | Ukani | |
| 6,052,804 A | 4/2000 | Thowe et al. | |
| 6,396,653 B1 | 5/2002 | Haines et al. | |
| 6,985,998 B2 | 1/2006 | Higashijima et al. | |
| 7,355,804 B1 * | 4/2008 | Kassab | G11B 5/02 360/46 |
| 7,375,917 B1 * | 5/2008 | Fujii | G11B 5/5534 360/78.04 |

(Continued)

*Primary Examiner* — Peter Vincent Agustin
(74) *Attorney, Agent, or Firm* — Hall Estill Attorneys at Law (57) ABSTRACT

Apparatus and method for managing a data storage device during extended idle conditions of the data storage device in which host access commands are not being received or serviced. In some embodiments, upon detection of an idle condition, a control circuit identifies a selected data transducer of the data storage device and a corresponding initial radial position of the data transducer with respect to an associated rotatable data recording surface. The control circuit performs a serpentine seek operation during the idle condition to gradually advance the selected data transducer in a selected radial direction across the data recording surface beginning at the initial radial position and ending at a final radial position. The serpentine seek operation prevents the transducer from being maintained in a stationary position during the idle condition, reducing the likelihood of damage through thermal asperity contact events, lubrication disturb, wear, etc.

20 Claims, 7 Drawing Sheets

(56) References Cited

U.S. PATENT DOCUMENTS

| | | | |
|---|---|---|---|
| 7,872,822 B1 | 1/2011 | Rothberg | |
| 8,687,313 B2 | 4/2014 | Selvaraj | |
| 8,760,796 B1 * | 6/2014 | Lou | G11B 5/5586 360/78.04 |
| 8,780,479 B1 | 7/2014 | Helmick et al. | |
| 8,995,082 B1 | 3/2015 | Lou et al. | |
| 9,142,235 B1 | 9/2015 | Babinski et al. | |
| 2002/0154439 A1 * | 10/2002 | Sloan | G11B 5/5521 360/75 |
| 2003/0086200 A1 * | 5/2003 | Tokizono | G11B 5/5521 360/78.06 |
| 2007/0127335 A1 * | 6/2007 | Morimoto | G11B 7/1267 369/47.5 |
| 2010/0134912 A1 | 6/2010 | Koester | |

\* cited by examiner

SERPENTINE SEEKS DURING DATA STORAGE DEVICE IDLE PERIODS

RELATED APPLICATIONS

The present application makes a claim of domestic priority under 35 U.S.C. 119(e) to U.S. Provisional Application No. 62/372,594 filed Aug. 9, 2016, the contents of which are hereby incorporated by reference.

SUMMARY

Various embodiments of the present invention are generally directed to management of a data storage device during extended idle conditions of the data storage device in which host access commands are not being received or serviced.

In some embodiments, a method includes the detection of an idle condition for a data storage device as the passage of a selected, uninterrupted amount of time since execution of a most recently received host access command. A selected data transducer is identified, along with its initial radial position with respect to an associated rotatable data recording surface. A serpentine seek operation is performed during the idle condition to gradually advance the selected data transducer in a selected radial direction across the data recording surface beginning at the initial radial position and ending at a final radial position. The data recording surface rotates at least 100 times while the data transducer moves in the selected radial direction.

In further embodiments, a data storage device has a rotatable data recording surface divided into at least first and second concentric zones. The first zone is adjacent an outermost diameter (OD) of the data recording surface and the second zone adjacent an innermost diameter (ID) of the data recording surface. A data transducer is configured to be positioned adjacent data tracks within each of the first and second zones to write data thereto and read data therefrom. A control circuit is configured to detect an idle condition passage of a selected, uninterrupted amount of time since execution of a most recently received host access command by the data storage device, identify an initial radial position of the data transducer including a selected one of the first or second zones adjacent which the data transducer is disposed, and to perform a serpentine seek operation during the idle condition to gradually advance the data transducer from the initial radial position to a final radial position located in the remaining one of the first or second zones. The serpentine seek operation requires at least one full second of elapsed time during which the transducer is moved away from the initial radial position and toward the final radial position.

In still further embodiments, a hard disc drive (HDD) has a rotatable magnetic recording medium with a data recording surface divided into at least first and second concentric zones. The first zone is adjacent an outermost diameter (OD) of the data recording surface and the second zone is adjacent an innermost diameter (ID) of the data recording surface. A data transducer is configured to write data to and read data from various data tracks disposed in the respective first and second zones. A closed loop servo control circuit is configured to position the data transducer adjacent the various data tracks disposed in the respective first and second zones responsive to commands stored in a command queue. A serpentine seek controller circuit is configured to, responsive to detection of an idle condition of host device inactivity for the data storage device, transfer one or more seek commands to the command queue to execute a serpentine seek operation during the idle condition to gradually advance the data transducer from an initial radial position in a selected one of the first or second zones to a final radial position located in the remaining one of the first or second zones. The serpentine seek operation passes across a radial midpoint of the data recording surface between the first and second zones and requires at least one full second of elapsed time and at least 100 revolutions of the data recording surface during which the transducer is moved away from the initial radial position and toward the final radial position.

DETAILED DESCRIPTION

Some data storage devices such as hard disc drives (HDDs) store data on one or more rotatable magnetic recording media (discs). The discs are accessed by a corresponding array of data read/write transducers (heads). The transducers are supported adjacent the disc surfaces by fluidic currents established by high speed rotation of the discs. Current generation transducers may be flown at fly heights in the range of tens of Angstroms (e.g., $10^{-9}$ m), and it is expected that fly heights will continue to decrease in the future. The transducers may be radially advanced across the disc surfaces using a rotary actuator.

Concentric data tracks are defined on the various disc recording surfaces. Data may be written to the tracks using a magnetic write element of the transducer having a coil that generates magnetic write fields which establish sequential magnetization patterns in a recording layer of the associated surface. Data may be read from the tracks using one or more read sensors in the transducer that sense the previously written magnetization patterns.

One issue that has arisen in some HDDs and other forms of data storage devices that utilize rotatable data recording media relates to head failures that occur after extended periods of host idle time. Idle periods of time, also referred to as idle conditions, are extended intervals during which the device remains in an operationally ready state, but no pending host access commands (e.g., data read or write commands) are received or being serviced. During an idle condition, the device is essentially maintained in a ready state waiting for a new command. The discs may continue to be rotated and system lock of the heads with respect to the media is maintained. This is in contrast to lower power modes where the device may be partially or fully powered down.

During normal operation of the data storage device, a servo controller circuit directs the respective data transducers to positions adjacent different tracks on the various data recording surfaces to service host data access commands. No such positioning changes of the heads are normally commanded once all the pending access commands have been serviced.

It has been found that leaving the heads "as is," that is, in the most recently accessed location during an idle condition can potentially induce significant reliability degradation and failure modes in some devices. Issues can include accelerated burnishing of the heads from repeated thermal asperity contact events, disturbance of a lubrication layer on the top surface of the discs (so called "lube disturb"), wear of the transducer and media surfaces, etc.

For example, if a thermal asperity (e.g. a localized defect on the media surface of sufficient size to contact the head) is present on a track over which the heads are positioned, this thermal asperity will contact the associated head many times as the head is maintained adjacent the track. This can induce accelerated wear of various air bearing features of the head and induce damage to the media surface as well.

It is common to apply a thin layer of lubricant to the disc surfaces. Maintaining a head in a fixed relation to the disc surface can disturb this lubricant layer by forming a trough in the lubricant at that particular radius as well as accumulating lubricant on the transducer which can affect the flight characteristics of the transducer. Moreover, discs are often provided with a carbon overcoat protective layer and repeated contact between the head and the disc in a particular location, such as a result of thermal asperity events, can cause wear and damage to the media surface and/or the transducer One option is to move the heads to a fixed position, such as against an innermost or outermost limit (crash) stop so that the heads are not disposed over the data recording portions of the discs. This is not optimal for a number of reasons, including the power requirements necessary to maintain the actuator in this position as well as the fact that lubrication disturbance, wear and thermal asperity contact events can occur in this position as well.

Another option is to offload the transducers to a safe parked position away from the rotating disc surfaces, such as onto a ramp load/unload structure. This avoids the problems discussed above, but raises others such as extended amounts of recovery time once new host access commands are issued. For example, once a new host access command is received, a significant amount of time will likely be required to move the heads off of the ramp structure and out onto the disc surfaces, acquire system lock so that the system accurately determines the locations of the heads, and then move the heads to the required radial position to service the commanded access request.

Various embodiments accordingly provide a method and apparatus for managing a data storage device during an extended host idle condition. As explained below, some embodiments include detecting an idle condition associated with receipt of host access commands. A selected head and its radial position are identified. A serpentine seek operation is thereafter commanded to translate the selected head from a first radial zone to a second radial zone across the associated data recording surface.

If a host access command is detected during such processing, the serpentine seek operation is aborted and the device proceeds to service the command. Once the next idle period is detected, the interrupted serpentine seek command profile may be resumed using the existing selected head, or a new head may be selected and a new serpentine seek operation can be initiated.

In some embodiments, the serpentine seek operation uses a discrete profile made up of a large number of relatively short distance seeks followed by relatively short periods of dwell time for each seek. In one embodiment, the profile is made up of, for example, a large number (e.g., 1000, etc.) of short seeks (e.g, 1-100 tracks each) with intervening short dwell times (e.g., 4-8 milliseconds, ms) on each track at the conclusion of each seek. Other respective values can be used. The seeks generally migrate the associated head in a direction from one edge of the disc surface (such as adjacent the outermost diameter, OD) to the other edge (such as the innermost diameter, ID). Generally, the selected head will remain on each destination track in turn for less than a full revolution of the medium.

In other embodiments, a low velocity, seek is used as the serpentine seek profile so that the head continuously translates to the destination track in the other zone. A velocity controlled seek with a very low maximum velocity can be used so that the head continuously, and slowly, sweeps across the media surface. This can be advantageous over the discrete seek approach from a power, acoustics and bearing friction perspective.

In either case, it is contemplated that the entire serpentine seek operation may take one or more seconds to complete, such as but not limited to 1-5 seconds for 2½ inch form factor media (e.g., nominally 65 mm discs) and 3½ inch form factor media (e.g., nominally 95 mm discs). Depending on the rotational velocity of the media and the relatively slow speed with which the data transducer is advanced during the serpentine seek operation, it is contemplated that the associated disc surface will rotate at least 100 times, and perhaps as many as 1000 times or more, as the selected head is moved across the surface.

In this way, the head does not dwell too long in any one location, reducing thermal asperity, wear, and lubrication disturbance effects. Also, the heads will be somewhat in an advantageous location in most cases when the next host access command is issued, reducing latency times for the device to respond and resume normal data transfer operation. Time delays associated with unloading the heads from a safe parked position and acquiring system lock are avoided.

Figure 1:
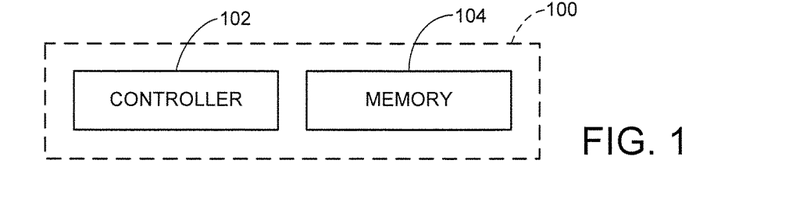
FIG. 1 is a functional block representation of a data storage device constructed and operated in accordance with various embodiments of the present disclosure.

These and other features and advantages of various embodiments can be understood beginning with a review of FIG. 1 which shows a functional block diagram for a data storage device 100. A controller circuit 102 provides top level control for the device, and a memory module 104 includes non-volatile memory and associated read/write circuitry to facilitate data transfers between the memory and a host device.

Figure 2:
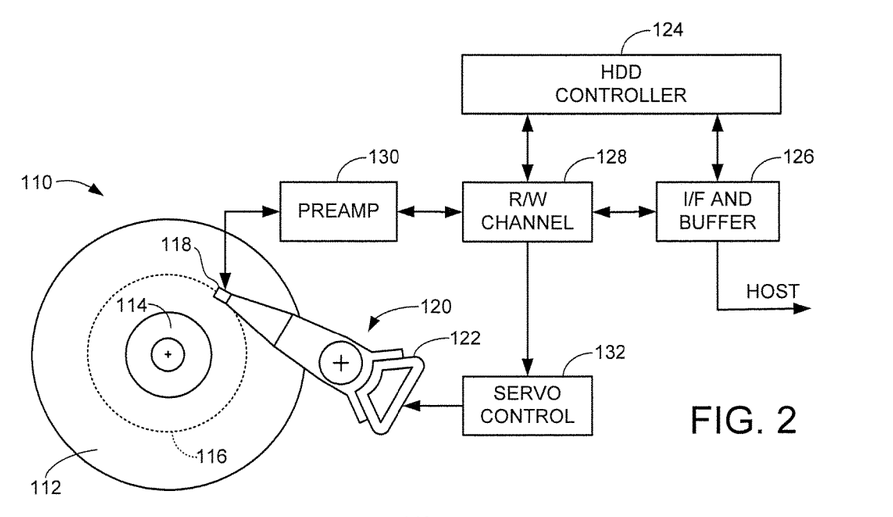
FIG. 2 shows the data storage device in greater detail.

FIG. 2 is a schematic representation of a data storage device 110 that generally corresponds to the device of FIG. 1. The device 110 in FIG. 2 is characterized as a hard disc drive (HDD). Other arrangements can be used. One or more magnetic recording media (discs) 112 are rotated at high speed by a spindle motor 114. A number of concentric data tracks are defined on the respective data recording surfaces. One such track is denoted at 116.

A data read/write transducer (head) 118 is configured to write data to and read data from data sectors defined on the various tracks 116. The transducer 118 is supported by a rotary actuator 120 which pivots about a pivot point through application of current to a voice coil 122 of a voice coil motor (VCM). Multiple pairs of transducers and disc surfaces may be used, with the discs axially aligned in a disc stack and the transducers nominally aligned at the distal end of the actuator 120.

An HDD controller circuit 124 generally corresponds to the controller 102 in FIG. 1 and may be realized as a hardware or programmable processor with executable programming steps stored in a memory. An interface (I/F) and buffer circuit 126 provides communication and data buffering functions for the host device. A read/write (R/W) channel 128 provides signal conditioning of input write data from the host during write operations and signal processing and data recovery during read operations. A preamplifier driver (preamp) circuit 130 applies various control signals, including write currents, read bias currents, diode power values, etc. to the respective heads 118.

A closed loop servo control circuit 132 provides positional control inputs to the voice coil 126 to position the heads 118. Two main modes are enacted by the servo controller circuit 132 during normal device operation: seeking and track following. A seek generally involves movement of a selected head 118 from an initial track to a destination track across the corresponding data recording surface. Track following generally entails maintaining the selected track nominally centered (or in some other desired relation) to a selected track.

Figure 3:
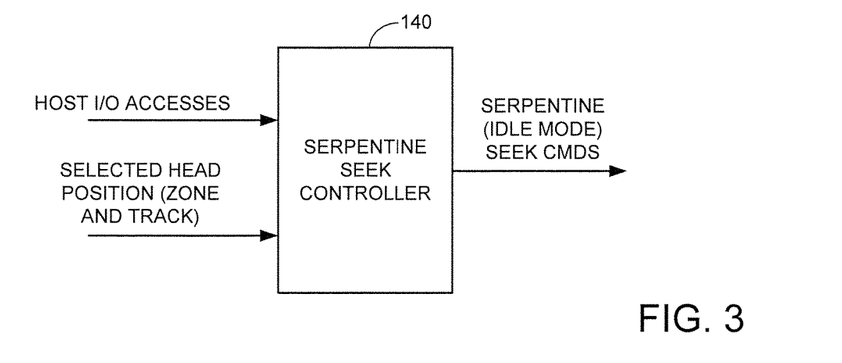
FIG. 3 shows a serpentine seek controller of the device of FIG. 2.

A third mode of the servo circuit 132 is referred to herein as idle processing mode, or serpentine seek mode. This is enacted using a serpentine seek controller 140 as generally depicted in FIG. 3. The controller 140 may form a portion of the HDD controller 124, the servo control circuit 132, or some other aspect of the device. As before, the controller 140 may be realized as a hardware based or programmable processor that uses associated programming steps stored in a suitable local memory.

Generally, the serpentine seek controller 140 receives a number of inputs, including a monitoring of host I/O accesses and an indication of the then selected head that is currently operative in the system along with its relative position. At such time that the system determines that the device should enter the idle mode, a profile of serpentine seek commands are issued to cause the selected head to carry out a serpentine path across the associated recording surface. The idle condition may be detected as the passage of a continuous amount of time since receipt and servicing of the most recent host access command. In one embodiment, idle condition is declared once nominally 100 milliseconds, ms have passed since the servicing of the most recent host access command (and no new commands have been received in the interim). Because of the unique operation of the serpentine seeks to maintain the heads adjacent medial portions of the disc surfaces, as well as the ability to immediately interrupt the serpentine seek operation to service a newly received command at any time, a much shorter period of time can be used to declare an idle condition, such as 10 ms or some other value. This can enhance reliability while minimizing latency impact on the operation of the device.

Figure 4:
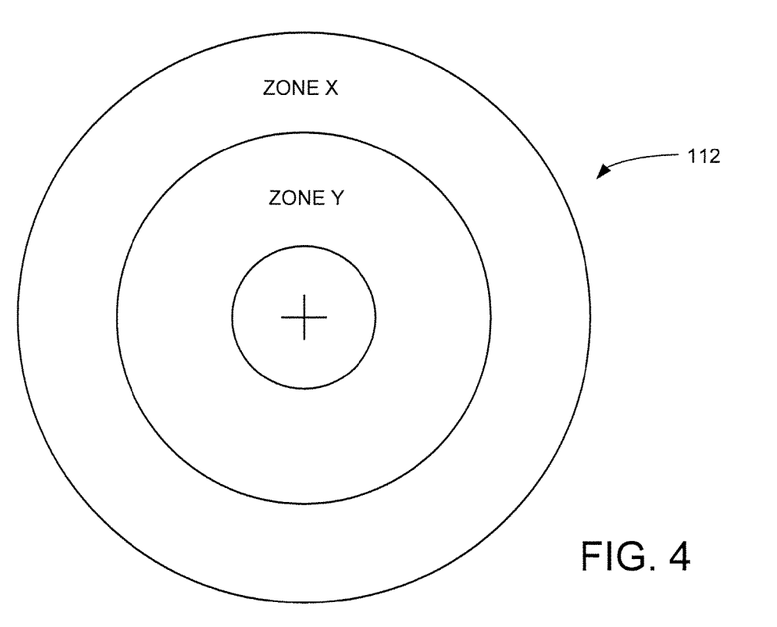
FIG. 4 shows different radial zones defined on the storage medium of FIG. 2.

FIG. 4 shows a selected recording surface of the data recording medium (disc) 112 from FIG. 2. The surface has been divided into two concentric zones referred to for convenience as Zone X and Zone Y. Any number and relative sizes of zones can be used, so the two exemplary zones in FIG. 4 are merely for purposes of illustration. The boundary between the respective Zones X and Y can be viewed as a midpoint of the storage surface.

Generally, Zone X represents the outermost X % of tracks on the surface, and Zone Y represents the innermost Y % of tracks on the surface, where X %+Y %=100%. The zones may each have the same radial width or may have different widths. During an idle condition, the controller 140 identifies the zone in which the selected head is disposed, and initiates a serpentine seek operation to gradually advance the selected head toward the other, remaining zone. As used herein, the term "serpentine seek" means a special form of seek that translates the transducer at a rate of translation that is significantly lower than a normal operational seek used to move the data transducer from the initial position to the final destination position. In at least some cases, the serpentine seek covers at least 50% of the radius of the disc recording surface and crosses a midpoint thereof. The serpentine seeks may be made up of a large number of small discrete seeks or one large continuous seek, as will now be explained.

Figure 5:
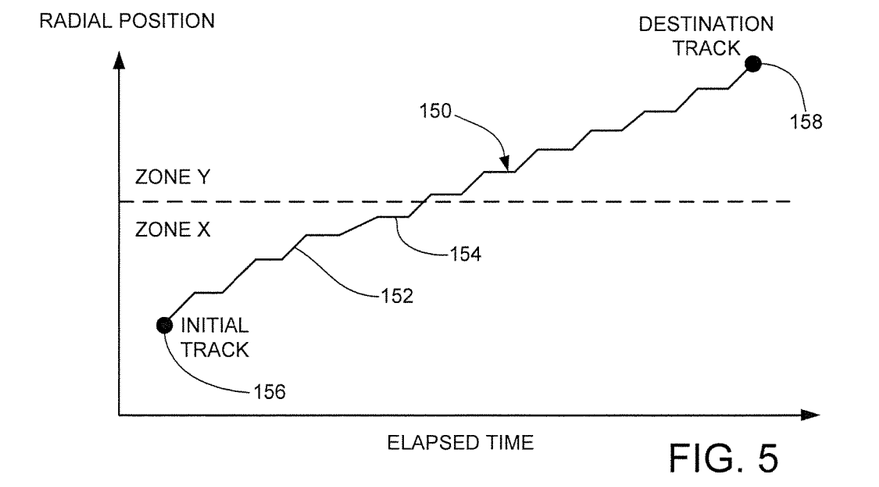
FIGS. 5-7 show graphical representations of different serpentine seek profiles carried out by the controller of FIG. 3 in some embodiments.

An exemplary serpentine seek profile is shown at 150 in FIG. 5. The profile is exaggerated for clarity and may have a finer resolution than that shown. Generally the profile is plotted against an elapsed time x-axis and a radial position y-axis, and involves short seeks (indicated by angled segments 152) followed by short track following dwell times (indicated by horizontal segments 154). A number of such seeks are carried out in succession to slowly advance the head from an initial track 156 in Zone X to a destination track 158 in Zone Y.

It is contemplated that the initial track 156 will be proximate the starting location of the selected head at the commencement of the idle mode processing. The destination track 158 can be selected as a randomly identified track in the other zone (Zone Y), such as a predetermined number of tracks away from the initial track. Depending on the configuration of the drive, many hundreds of thousands of tracks or more may be defined on each disc surface. Each short seek may be any suitable length, including single track seeks up to seeks of tens of tracks in length or more. The total number N of seeks in the profile can also be selected as desired. It is contemplated that the seek will require at least a full second, or several seconds or more, to complete the movement of the head from the initial track to the final destination track.

Figure 6:
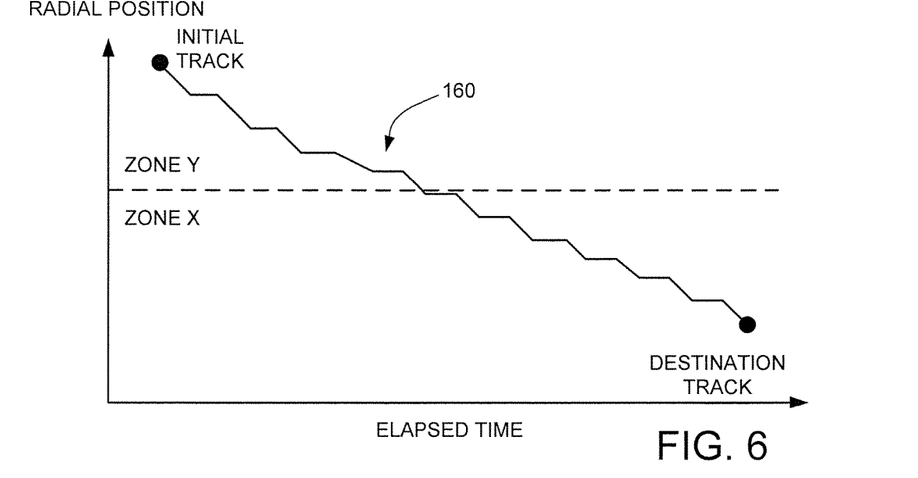

FIG. 6 shows another serpentine seek profile 160. The profile 160 is similar to the profile 150, except that the initial track is disposed within Zone Y and the destination track is located in Zone Z. It is contemplated that if the profile in FIG. 5 is completed for a first head, a different, second head may be selected and the profile 160 in FIG. 6 may be applied to the second head. The foregoing processing will continue as each head is selected in turn and the heads slowly move, in a serpentine fashion, back and forth across the various disc surfaces.

Figure 7:
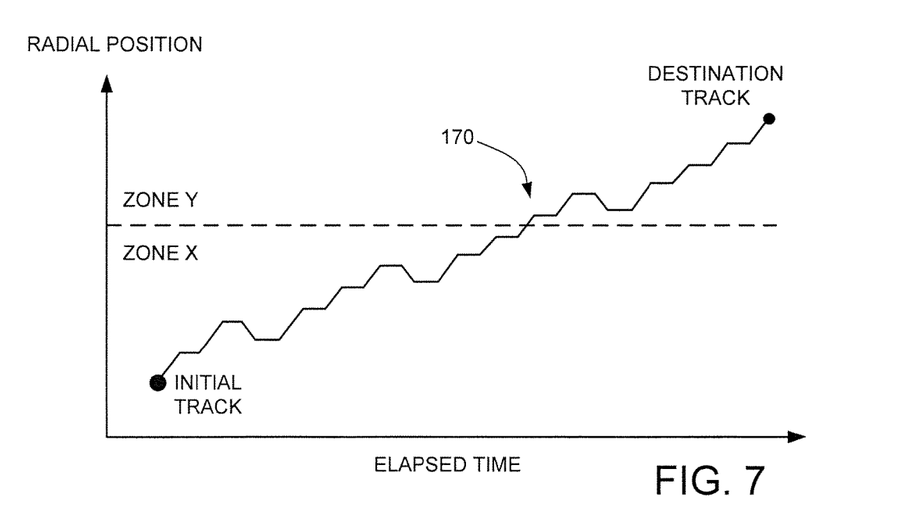

FIG. 7 shows yet another exemplary serpentine seek profile 170 in accordance with further embodiments. While it is contemplated that the various seeks will tend to advance a given head toward the other zone, FIG. 7 shows that in some cases, as desired the head may be advanced several times toward the other zone, followed by an occasional retraction of the head away from the other zone. Thus, while the net movement of the selected head is toward the other zone, this shows that this does not necessarily require every single seek to be toward the other zone. Various other alternatives will readily occur to the skilled artisan in view of these profiles.

Figure 8:
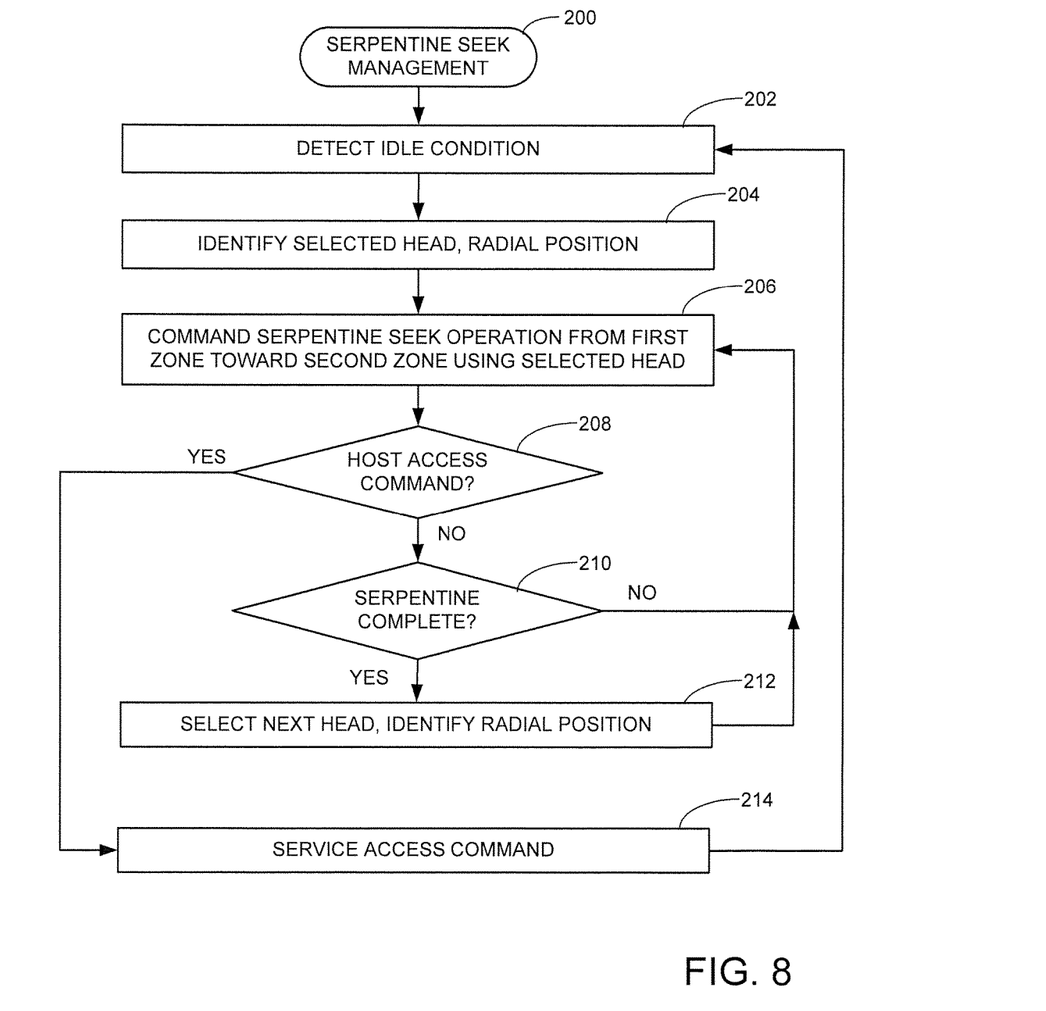
FIG. 8 is a serpentine seek management routine representative of programming that may be executed by the controller in some embodiments.

FIG. 8 is a flow chart for a serpentine seek management routine 200 illustrative of various steps that may be carried out in accordance with the foregoing discussion. These steps may represent programming instructions executed by the controller 140. Other arrangements can be used.

The flow begins at step 202 where an idle period for the device 110 is detected. As noted above, this may be some selected interval of time, such as 100 ms, etc., during which no pending access commands have been received or serviced, so that the device 110 is now in an idle mode.

At this point a selected head and its corresponding radial position are identified at step 204. In some cases, the most recently utilized head will be used as the selected head, as this is the head that the servo control circuit is currently controlling. In other cases, a first head out of the plurality of heads can be identified as the selected head, which may involve a head switch operation. Generally, it is contemplated that the location of the selected head will be largely random, in the sense that it will be proximate whatever location was last serviced.

As shown by step 206, a serpentine seek operation is performed to slowly advance the selected head from a first zone to a second zone across the corresponding disc surface. While not limiting, the serpentine seek operation may comprise a succession of relatively short seeks each from a different initial track to a different destination track, along with a relatively short dwell time on each destination track in turn, as discussed above in FIGS. 5-7. The seeks may be of relatively short duration, such as about 1 to 5 ms, and the dwell times may also be relatively short such as from about 4 to 8 ms. Other relative durations can be used. If a discrete profile is used, the head may persist on each destination track for less than a full revolution of the disc. If a continuous serpentine seek operation is used, as explained below, the head will not persist on such intermediate tracks but the controller will otherwise generally follow the flow of FIG. 8.

The process determines at decision step 208 whether a host access command has been received; if not the process determines at decision step 210 whether the current serpentine profile is still in progress. If not, processing continues at step 206 until the current serpentine profile is completed. At this point, the flow passes from step 210 to step 212 where the next head is selected and the radial position of the selected head is identified, and the routine passes back to step 206. Provided a host access command is not received in the interim, the respective operations of steps 206 through 212 will cycle through the various heads, alternatingly moving the heads inboard and outboard across the various surfaces.

Once a host access command is invariably received, the process flows from step 208 to step 214, where the access command is serviced. This may be the only command received, or a succession of commands may be thereafter received. Regardless, as shown by FIG. 8, the idle condition is terminated and the data storage device resumes normal operation. The process will return to step 202 and be repeated at the occurrence of the next idle period.

It is contemplated that each time through the serpentine seek management routine, a different starting head and starting position may be selected. Thus, a "standard" profile can be selected and enacted each time, on the basis that the starting and ending positions will be different based on the initial track for the first selected head. The dwell times and seek lengths are selected such that, even if a thermal asperity is encountered, there will not be a significant amount of wear or contact. Low power and other benefits can be realized as well.

Figure 9:
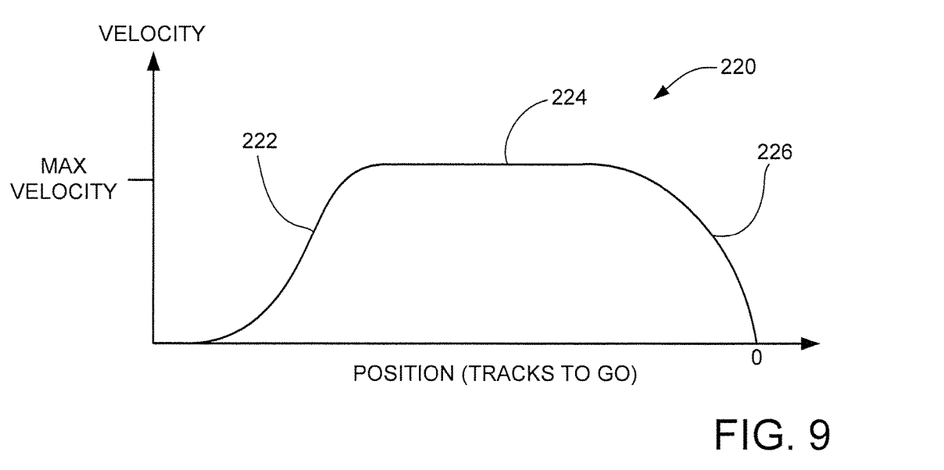
FIG. 9 is a graphical representation of a velocity controlled seek profile illustrative of seeks that may be carried out by the data storage device in accordance with some embodiments.

Further details regarding the processing of the serpentine seek profiles of FIGS. 5-7 will now be discussed with reference to FIG. 9, which shows an exemplary velocity controlled seek profile curve 220. The curve is plotted against a position x-axis in terms of tracks to go to the final destination track (denoted as track 0), and a current magnitude y-axis indicative of applied current to the VCM coil 122 (FIG. 2).

As will be recognized, a velocity controlled seek generally involves measuring the velocity of the selected transducer and causing the velocity to follow a particular profile such as the profile curve 220 to the destination track. The seek includes an initial acceleration phase 222 in which the transducer is accelerated from an initial radial velocity (usually zero) to a maximum velocity, followed by a coast phase 224 in which the transducer is nominally maintained at the selected maximum velocity. A deceleration phase 226 is designed to decelerate the transducer to arrive at the destination track.

The velocity controlled seek profile is one type of seek operation that can be used for seeks of extended length during normal device operation. Normally, such seeks may be used for relatively large distances, such as 100 tracks or more. Nevertheless, velocity controlled seeks can be used for shorter seeks, particularly if a relatively lower maximum velocity is selected (coast phase 224). Thus, in some embodiments velocity controlled seeks may be used as part of the serpentine seek profile.

Figure 10:
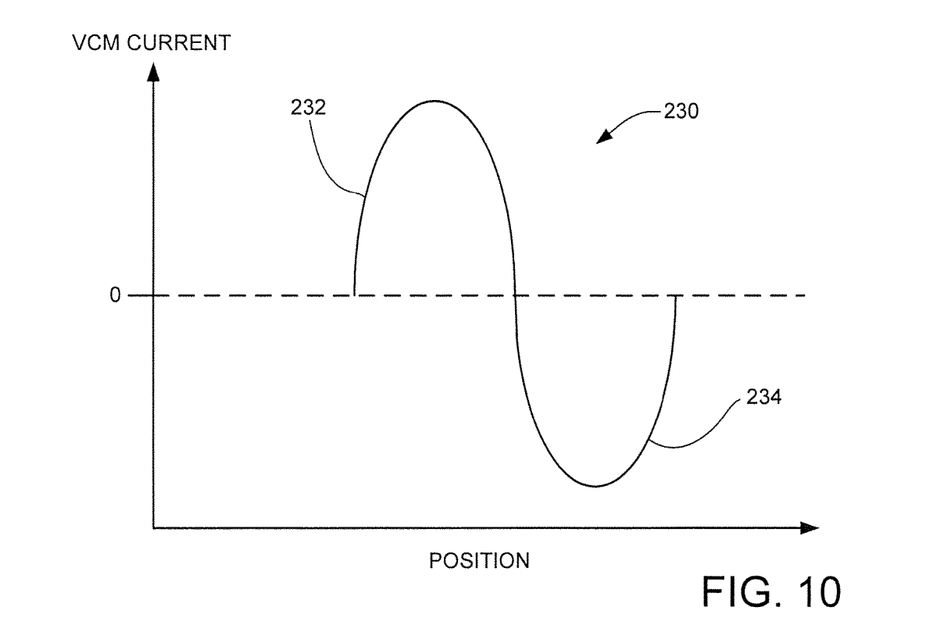
FIG. 10 is a graphical representation of a model reference seek profile illustrative of further seeks that may be carried out by the data storage device in accordance with some embodiments.

FIG. 10 shows a model reference seek profile curve 230 that may be used in further embodiments. The model reference seek profile 230 is plotted against a position x-axis and a current magnitude y-axis. The seek profile 230 generally takes a sinusoidal profile, such as a 1-cosine profile, with an acceleration phase 232 and a deceleration phase 234. Model reference seeks may be position controlled and tuned to achieve shorter seek lengths, such as seeks from one track in length (e.g., advancement of the transducer to the next adjacent data track) up to some larger number of tracks, such as 100 tracks or more. In further embodiments, the serpentine seek profile may incorporate the use of a succession of model reference seeks.

Figure 11:
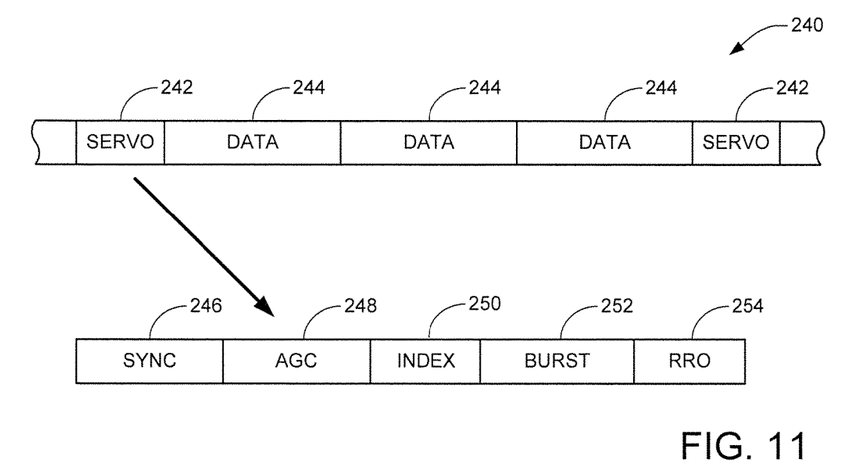
FIG. 11 shows an exemplary format for a data track of the storage device.

FIG. 11 shows an exemplary data track 240, which is similar to the track 116 in FIG. 2. Other formats may be used. The track includes a succession of spaced apart servo fields 242. Fixed sized data sectors 244 are provided using a formatting operation in the regions between adjacent pairs of the servo fields 242. The embedded servo fields 242 are used to provide positional control information to the servo control circuit 132 (see FIG. 2), and the data sectors 244 are used to store fixed sized blocks of user data, such as 512 bytes, via the I/F and buffer 126, channel circuitry 128 and preamp 130 (FIG. 2).

An exemplary format for each servo field 242 includes a synchronization (sync) field 246, an automatic gain control (AGC) field 248, an index field 250, a track address field 252, a burst pattern field 254 and a repeatable runout (RRO)

compensation field 256. Other formats may be used, including formats that use other fields and/or fields in different respective orders.

The sync field 246 provides a unique synchronization pattern used in each of the servo fields that has a large Hamming distance from any acceptable pattern that may otherwise be stored to the recording surface. Detection of this pattern enables the channel circuitry 128 to detect the commencement of the servo field 242. The AGC field 248 provides a repeating pattern (such as a 2T) pattern that enables readback circuitry such as in the preamp 130 to set phase and amplitude parameters to enable recovery of the remaining servo data in the servo field.

The index field 250 provides a once-around index position to enable the servo control circuit 132 to determine the angular position of the disc 112. This position may be viewed as the zero degrees (0°) position on the disc. The track address field 252 stores a multi-bit value, such as expressed using Gray code, to denote each track. The burst pattern field 254 may include a succession of di-bit burst patterns, such as PS1 and PS2 or ABCD patterns, to provide intra-track positional control. The combination of the track address field 252 and the burst pattern field 254 enable the servo circuit 132 to determine the radial position of the read sensor of the transducer across the disc 112.

The RRO compensation field 256 is an optional field that may store one or more RRO compensation values to correct for repeatable error in the radial placement of the respective servo fields. In this way, during a servo track following mode, the servo circuit can use the Gray code to determine the head is following the appropriate track, use the burst pattern fields to detect the relative (raw) location of the head with respect to the track, and the RRO compensation values to compute corrections so that the head is nominally caused to follow a concentric circular path along the track at a desired position relative to the track (e.g., over track center or some positive or negative offset distance from the center of the track).

The various exemplary serpentine seek profiles discussed above involve both relatively short (and potentially relatively slow) seeks followed by short durations of track following. One exemplary profile may involve some number M of short seeks of duration N, intermingled with dwell times of track following of duration P, where M, N and P are suitable integers (such as, without limitation, M is up to 1000 seeks, N is a seek length of 50 tracks, and P is a dwell time of nominally 5 ms). Other arrangements can be used including profiles where each of these variables M, N and P are altered as required.

Figure 12:
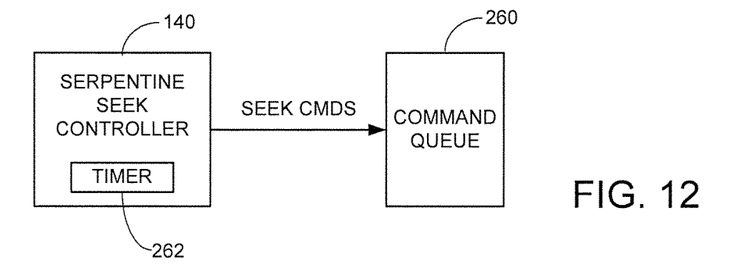
FIG. 12 illustrates operation of the serpentine seek controller circuit of FIG. 3 in conjunction with a command queue.

Any number of command sequencing can be provided by the serpentine seek controller circuit 140. One mechanism employs using the controller to issue the individual seeks to a command queue 260 of the servo circuit 132, as depicted in FIG. 12. The seeks may be issued one at a time so that the servo controller circuit 132 immediately commences with each received seek in turn.

While not limiting, seeks such as described above in FIGS. 9 and 10 generally operate to bring the selected head onto the target track. Because of the mechanical nature of the system, some small amount of mechanical oscillation (ringing) may occur as the head settles onto the destination track. An operation known as servo qualification (servo qual) may be used to determine that the head is now successfully located on the destination track. Servo qual may require, for example, some number X of successive servo fields 242 being decoded with the detected position of the transducer being found to be within some percentage Y of the intended location on the track. For example, a seek may be declared successfully completed after the detection of five (5) servo fields (X=5) with the head within 10% (Y=10%) of track center. At the end of servo qual, the system commences to track following mode. Normally the servo circuit 132 will maintain the selected head on the existing track until a new seek command is received.

Accordingly, as further shown in FIG. 12, a timer circuit 262 can be initialized by the serpentine seek controller circuit 140 each time that the servo control circuit 132 outputs a seek completed command indicating that the most recently performed seek has been successfully completed and the system has transitioned to track following mode. The timer can increment to a maximum value corresponding to some predetermined increment of elapsed time (e.g., 5 ms, etc.), after which the controller circuit 140 can issue the next seek command in the serpentine seek profile.

This provides a simple and easy way to carry out the serpentine seek profile with minimal overhead. Moreover, by only placing a single seek command in the queue at a time, receipt of a new pending access command can be immediately serviced since that command will enter the queue and be acted upon by the servo control circuit. The serpentine seek controller circuit 140 can monitor the command queue 260 and, upon detection of a normal host access command, can terminate the serpentine seek processing.

Figure 13:
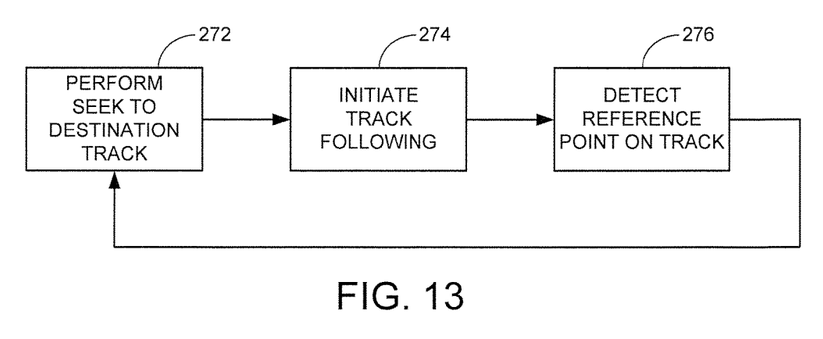
FIG. 13 is a process flow showing steps that may be carried out in some embodiments.

Other mechanisms can be used to establish the appropriate dwell times during the serpentine seek processing. As shown in FIG. 13, a flow sequence includes a seek to the next selected destination track at block 272. Once servo qual has been completed, a track following operation is initiated at block 274. The servo controller circuit 132 continues to follow the designated track until a selected feature, or reference point, has been detected on the track, block 276. Once the reference point has been detected, the flow returns to block 272 to perform the next seek in the profile.

Any suitable reference point can be used. In some embodiments, detection of the once-around index point on each track can be used as the reference point, so that each dwell time is, at most, a full revolution of the disc. For discs rotated at 7200 revolutions per minute (rpm), this would provide variable dwell times that are, at most, about 8.33 ms. This would provide a variable amount of dwell time, but a fixed angular location when each new seek would be initiated.

Another reference point may be to count a maximum number of servo fields 242 or data sectors 244, such as 100 such fields/sectors, etc. Yet another reference point would be a given data sector on the destination track, such as the $200^{th}$ data sector, etc. This latter approach would provide a controlled and consistent amount of dwell time on each track. Moreover, this latter approach would enable, as desired, the loading of multiple queued serpentine seeks in the command queue 260.

Because of the various dwell times between seeks, the system can operate to perform other calibration operations on the various tracks as desired that may normally be performed during idle periods. Such operations may include the setting or adjustment of head, VCM, servo circuit and/or write channel parameters. Without limitation, exemplary idle mode calibration routines may include compensation and adjustments involving servo gain, RRO, head fly height, head power settings (write current, bias current, laser power, heater power), read channel parameters, etc.

The foregoing embodiments do not necessarily involve the reading of any of the user data from the various data tracks during the dwell times between seeks. However, in further embodiments, such reads can take place to assess various aspects of system performance such as, for example, obtaining bit error rate (BER) measurements. Thermal asperities or other defect mapping can also take place. Areas requiring further action can be noted and set aside as an action list during additional idle period processing.

While the foregoing embodiments have presented various discrete serpentine seek profiles that involve many short seeks and intervening dwell times, continuous serpentine seek profiles can be used as will now be discussed. Such continuous seek profiles may be used in lieu of, or in addition to, discrete seek profiles.

Figure 14:
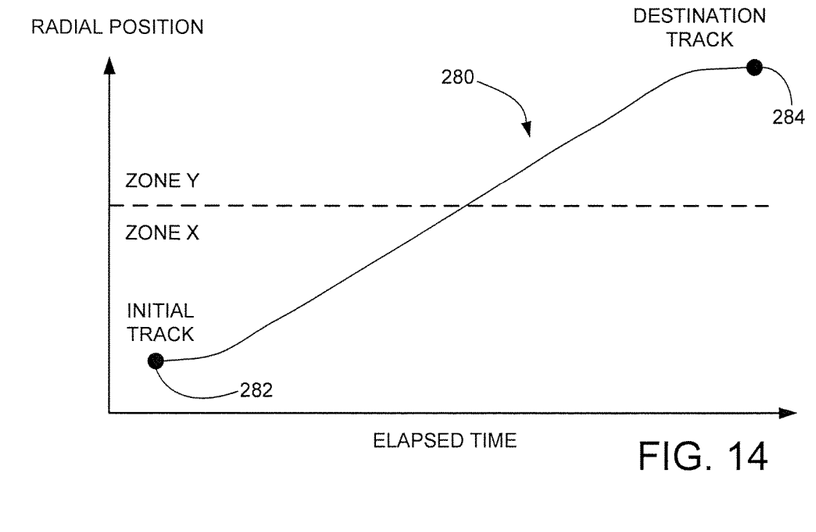
FIGS. 14-15 show graphical representations of different serpentine seek profiles carried out by the controller of FIG. 3 in further embodiments.

FIG. 14 shows another exemplary serpentine seek profile curve 280 in accordance with further embodiments. As before, the profile curve 280 is plotted against an elapsed time x-axis and a radial position y-axis. The curve begins at an initial track 282 (in Zone X) and ends at a final destination track 284 (in Zone Y).

The profile curve 280 is a continuous curve and may be performed as a single, relatively slow velocity controlled seek such as discussed above in FIG. 9. In this way, the selected transducer is slowly accelerated to a low maximum velocity which is maintained until the seek decelerates to a stop on the destination track. As with the discrete profiles discussed above, the continuous profile of FIG. 14 may take one or more seconds to complete.

It is contemplated that the maximum velocity used during the continuous serpentine seek operation will be substantially lower than the normal maximum velocity used during seeks to advance the data transducer to different radial locations to service host access commands, such as only 5% or less of this normal maximum velocity. In some cases, the maximum velocity during the continuous serpentine seek may be only 1%, or even only 0.1%, or even less than the normal velocity used during host access operations.

In some embodiments, a minimum continuous seek velocity CV in inches per second can be determined as follows:

$$CV = (N)(RPM)/((TPI)(60)) \qquad (1)$$

where N is the width in tracks of a typical thermal asperity (TA) or other defect large enough to damage the head over multiple revolutions, RPM is the rotational velocity of the disc, and TPI is the track density (tracks per inch). In some cases, TA defects may be found to be on the order of 500-1000 tracks in size, so the minimum velocity CV for the continuous seek may be selected to ensure that the head moves at least one TA width per revolution. This is merely exemplary as other scaling factors can be used as required.

Figure 15:
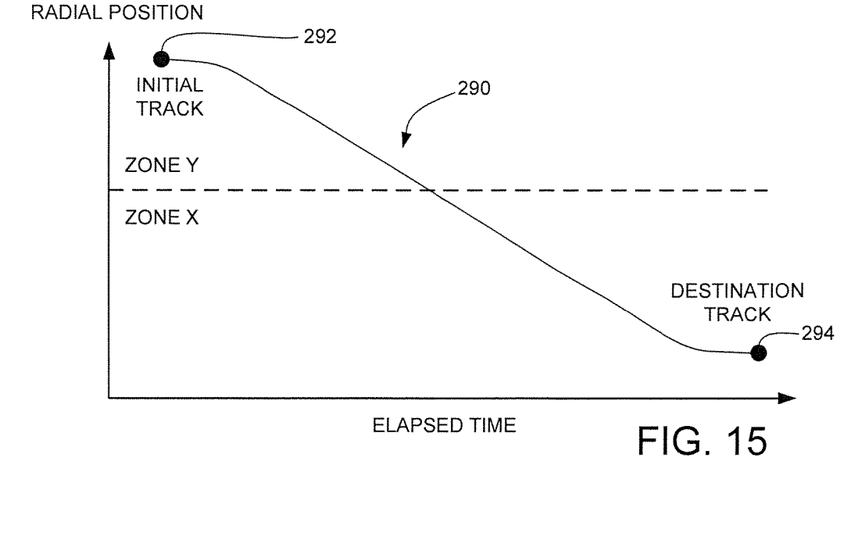

FIG. 15 shows another continuous serpentine seek profile curve 290 that translates a selected head from an initial track 292 in Zone Y to a final destination track 294 in Zone X. Continuous serpentine seek profiles such as those set forth in FIGS. 14 and 15 can be used during the routine of FIG. 8 as discussed above.

The initial track 282 in FIG. 14 can be the track on which the most recently used head is still present as a result of the most recently serviced host access command. Hence, the last track accessed by the most recently serviced host command can be the initial track for the serpentine seek operation. A head switch operation can be carried out so that the initial track 292 in FIG. 15 is the track this second head is adjacent at the conclusion of the head switch operation, and the second velocity controlled seek is carried out as indicated by curve 290 to the second destination track 294, and so on.

The continuous seeks of FIGS. 14-15 can be some number M of tracks (such as 100,000 tracks, etc.) in length, or can be some value based on the initial position of the first selected head with respect to an appropriate target location in the other zone. Different seek lengths can be selected in turn by the serpentine seek controller 140. As desired, both continuous and discrete profiles can be alternatively used.

It is contemplated that both the discrete serpentine seek operations (e.g., FIGS. 5-7) and the continuous serpentine seek operations (e.g., FIGS. 14-15) will commence at the beginning of each detected idle period. In further embodiments, the serpentine seek operations may be just one of several actions that can take place during idle conditions. For example, some storage devices may be arranged to perform various calibration tests, such as the adjustment of laser power levels in a heat assisted magnetic recording (HAMR) system by writing and/or reading various calibration tracks.

Various other forms of idle period calibration can be performed in addition to the serpentine seek profile operation. The system may be configured to perform any pending idle mode testing or adjustment initially at the beginning of a given idle period. Once such tests are completed, the system can transition to the serpentine seek profile operation for the remainder of the idle period.

The various embodiments are accordingly well adapted to present a number of benefits. The serpentine seek profile operations embodied herein reduce various deleterious effects that may arise through maintaining the heads adjacent the same track(s) for extended periods of time, such as lubrication disturbance, wear, excessive contact with thermal asperities, etc. The system maintains the heads in an aerodynamically supported relation adjacent the rotating discs, so delays associated with loading the heads from a parked position (such as a load/unload ramp) are avoided. The slow sweep of the heads across the medial locations of the disc surfaces further will tend to provide the heads in a location that is at least somewhat near the location needed to service the next received host access request. Other benefits may accrue as well, such as the sweeping of contaminants toward the innermost diameter (ID) or outermost diameter (OD) of the data recording surface.

It is possible to map the locations of thermal asperities and take these into account when selecting particular seeks so that tracks having such asperities are avoided. For example, the profile could be calculated based on the initial position of the selected head and the target tracks that will receive dwell times can be identified. This list can be quickly compared to a list of tracks having thermal asperities and small adjustments can be made to the seek profile to avoid the thermal asperities. However, such processing is not necessarily required since in the event that during the serpentine seek operation a head lands on a track and contacts a thermal asperity, or otherwise encounters a thermal asperity as the head is slowly swept across the disc surface, the head will generally only contact the asperity once or a few times, minimizing extended contact and wear events.

If the most recently accessed head is selected to begin the process at the most recently accessed track, the random nature of the host data accesses will generally tend to provide randomization in the tracks that are "visited" during the serpentine seek process. If a host access is required that interrupts a given sequence, the system can resume where it left off or start a new sequence including with a new head. The ability to resume the serpentine seeks from the point that the sequence was interrupted ensures the ability to always seek to new locations. For example, if the host executes repeated short writes or reads to a particular location on the discs, resuming a previous serpentine seek operation ensures a good distribution of the heads irrespective of the intermediate positioning of the heads.

Similarly, the serpentine nature of the sweeps using different heads operates to wear level reader stress; that is, the active head at any given time during a serpentine seek operation will generally require the read element to be activated for the selected head. By continually and successively switching to different heads in turn, no one head is activated for a significantly longer duration than the other heads, reducing the likelihood that one head "wears out" before the others.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A method comprising:
    detecting an idle condition for a data storage device comprising passage of a selected, uninterrupted amount of time since execution of a most recently received host access command by the data storage device;
    identifying a selected data transducer of the data storage device and a corresponding initial radial position of the data transducer with respect to an associated rotatable data recording surface of the data storage device; and
    performing a serpentine seek operation during the idle condition to gradually advance the selected data transducer in a selected radial direction across the data recording surface beginning at the initial radial position and ending at a final radial position, the data recording surface rotating at least 100 times while the data transducer is moving in the selected radial direction during the serpentine seek operation, the serpentine seek operation comprising a continuous velocity controlled seek of the data transducer during which the data transducer is accelerated away from the initial radial position, maintained at a maximum velocity, and decelerated to the final radial position.

2. The method of claim 1, wherein the maximum velocity is less than 5% of a maximum velocity used by the data storage device during seeks carried out to service host access commands.

3. The method of claim 1, further comprising a subsequent step of exiting the idle condition responsive to receipt of a host access command from the host device, and moving the data transducer to a destination track to service the host access command.

4. The method of claim 1, wherein the initial radial position comprises a selected data track to which user data was written or from which user data was read using the data transducer during execution of the most recently received host access command, and the serpentine seek operation begins at the selected data track and ends at a destination track on the rotatable data recording surface.

5. The method of claim 1, further comprising dividing the rotatable data recording surface into at least a first zone and a second zone, each of the first and second zones comprising a plurality of data tracks, determining the initial radial position is in a selected one of the first or second zones, and providing the selected radial direction to advance the data transducer toward the remaining one of the first or second zones.

6. The method of claim 1, wherein the data transducer is a first data transducer and the data recording surface is a first data recording surface, the data storage device comprises a second data transducer adjacent a second data recording surface and nominally aligned with the first data transducer, and wherein the method further comprises, at the conclusion of the serpentine seek operation, performing a head switch operation to switch from the first data transducer to the second data transducer while maintaining the first data transducer at the final radial position, using the location of the second data transducer adjacent the second data recording surface as a second initial radial position, and performing a second serpentine seek operation to advance the second data transducer from the second initial radial position to a second final radial position on the second data recording surface in a second radial direction opposite the selected radial direction.

7. The method of claim 1, wherein the rotatable data recording surface has a midpoint comprising a radial position that is nominally halfway between an innermost extent of the data recording surface and an outermost extent of the data recording surface, the initial radial position is on a first side of the midpoint, and the final radial position in on an opposing second side of the midpoint.

8. The method of claim 1, wherein the serpentine seek operation requires at least one full second to transition the selected data transducer from the initial radial position to the final radial position.

9. A data storage device comprising:
    a rotatable data recording surface divided into at least first and second concentric zones, the first zone adjacent an outermost diameter (OD) of the data recording surface and the second zone adjacent an innermost diameter (ID) of the data recording surface;
    a data transducer configured to be positioned adjacent data tracks within each of the first and second zones to write data thereto and read data therefrom; and
    a control circuit configured to detect an idle condition passage of a selected, uninterrupted amount of time since execution of a most recently received host access command by the data storage device, identify an initial radial position of the data transducer including a selected one of the first or second zones adjacent which the data transducer is disposed, and to perform a serpentine seek operation during the idle condition to gradually advance the data transducer from the initial radial position to a final radial position located in the remaining one of the first or second zones, the serpentine seek operation requiring at least one full second of elapsed time during which the transducer is moved away from the initial radial position and toward the final radial position, the serpentine seek operation comprising a succession of relatively short seeks each moving the data transducer from a different initial data track to different destination data track on the data recording surface between the initial radial position and the final radial position, the discrete serpentine seek operation including a relatively short dwell time on each of the different destination data tracks between successive pairs of the relatively short seeks so that the data transducer remains on each of the different destination tracks less than a full revolution of the data recording surface.

10. The data storage device of claim 9, wherein the data recording surface rotates at least 100 times while the data transducer is moving in the selected radial direction during the serpentine seek operation.

11. The data storage device of claim 9, wherein the data transducer reads servo data from spaced apart servo fields on each of the destination tracks and does not read user data from any user data sectors between adjacent pairs of the servo fields on each of the destination tracks.

12. The data storage device of claim 9, wherein the initial radial position comprises a selected data track to which user data was written or from which user data was read using the data transducer during execution of the most recently received host access command, and the serpentine seek operation begins at the selected data track and ends at a destination track on the rotatable data recording surface.

13. The data storage device of claim 9, wherein the data transducer is a first data transducer and the data recording surface is a first data recording surface, the data storage device further comprising a second data transducer adjacent a second data recording surface and nominally aligned with the first data transducer, and wherein the control circuit is further configured to, at the conclusion of the serpentine seek operation, perform a head switch operation to switch from the first data transducer to the second data transducer while maintaining the first data transducer at the final radial position, use the location of the second data transducer adjacent the second data recording surface as a second initial radial position, and perform a second serpentine seek operation to advance the second data transducer from the second initial radial position to a second final radial position on the second data recording surface in a second radial direction opposite the selected radial direction, wherein the second final radial position is disposed in the selected one of the first or second zones.

14. The data storage device of claim 9, wherein the rotatable data recording surface has a midpoint comprising a radial position that is nominally halfway between an innermost extent of the data recording surface and an outermost extent of the data recording surface, the initial radial position is on a first side of the midpoint, and the final radial position in on an opposing second side of the midpoint.

15. A hard disc drive, comprising:
a rotatable magnetic recording medium having a data recording surface divided into at least first and second concentric zones, the first zone adjacent an outermost diameter (OD) of the data recording surface and the second zone adjacent an innermost diameter (ID) of the data recording surface;
a data transducer configured to write data to and read data from various data tracks disposed in the respective first and second zones;
a closed loop servo control circuit configured to position the data transducer adjacent the various data tracks disposed in the respective first and second zones, the closed loop responsive to commands stored in a command queue; and
a serpentine seek controller circuit configured to, responsive to detection of an idle condition of host device inactivity for the data storage device, transfer one or more seek commands to the command queue to execute a serpentine seek operation during the idle condition to gradually advance the data transducer from an initial radial position in a selected one of the first or second zones to a final radial position located in the remaining one of the first or second zones, the serpentine seek operation passing across a radial midpoint of the data recording surface between the first and second zones and requiring at least one full second of elapsed time and at least 100 revolutions of the data recording surface during which the transducer is moved away from the initial radial position and toward the final radial position, the serpentine seek operation comprising a single continuous velocity controlled seek of the data transducer during which the data transducer is accelerated away from the initial radial position, maintained at a maximum velocity, and decelerated to the final radial position.

16. The hard disc drive of claim 15, wherein the serpentine seek controller circuit is a programmable processor having associated programming instructions stored in a memory and which are executed by the programmable processor.

17. The hard disc drive of claim 15, wherein the serpentine seek operation is characterized as a first serpentine seek operation and the final radial position is a first final radial position, and wherein at the conclusion of the first serpentine seek operation the serpentine seek controller circuit performs a second serpentine seek operation to advance the data transducer across the radial midpoint from the first final radial position to a second final radial position in a direction opposite the direction of the first serpentine seek operation.

18. The hard disc drive of claim 15, wherein the continuous velocity controlled seek of the serpentine seek operation achieves a maximum velocity of the data transducer that is less than 5% of a maximum velocity used by the data storage device during seeks carried out to service host access commands.

19. The hard disc drive of claim 15, wherein the initial radial position comprises a selected data track to which user data was written or from which user data was read using the data transducer during execution of the most recently received host access command, and the serpentine seek operation begins at the selected data track and ends at a destination track on the rotatable data recording surface.

20. The hard disc drive of claim 15, wherein the serpentine seek controller circuit is further configured to divide the rotatable data recording surface into at least a first zone and a second zone, each of the first and second zones comprising a plurality of data tracks, to determine the initial radial position is in a selected one of the first or second zones, and to provide the selected radial direction to advance the data transducer toward the remaining one of the first or second zones.

* * * * *